March 20, 1928.

H. P. CHANDLER

SUPPORT

Filed July 27, 1926

1,663,334

Inventor

HOMER P. CHANDLER

By

Attorney

Patented Mar. 20, 1928.

1,663,334

UNITED STATES PATENT OFFICE.

HOMER P. CHANDLER, OF MANSFIELD, OHIO, ASSIGNOR TO THE OHIO BRASS COMPANY, OF MANSFIELD, OHIO, A CORPORATION OF NEW JERSEY.

SUPPORT.

Application filed July 27, 1926. Serial No. 125,170.

My invention relates to the hangers or supports for conductors and especially to supports for suspending and insulating a trolley conductor from an overhead structure.

The object of my invention is to provide an insulator support for a trolley line or other conductor which can be detachably secured to an overhead support and which will insulate the trolley wire or conductor from the support.

Another object of my invention is to provide the hanger with means which will permit of its being attached to supports of varying sizes.

My invention resides in the new and novel construction, combination and relation of the various parts herein described and shown in the accompanying drawing.

Figure 1:
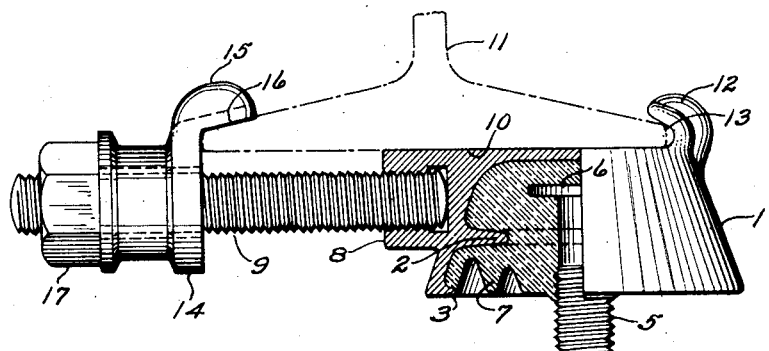

In the drawing, Fig. 1 is a side view in partial section and partial elevation.

Figure 2:
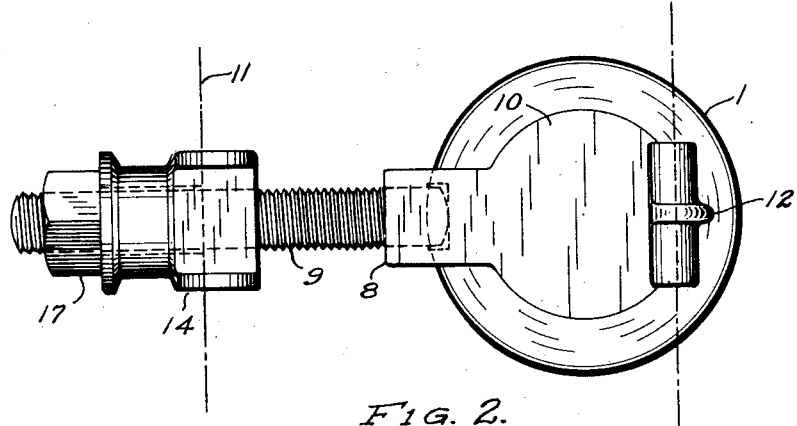

Fig. 2 is a top plan view of my device shown in Fig. 1.

In the preferred construction I employ a cup-shaped body member 1 made preferably of brass, bronze or a malleable iron. Mounted within the interior of the member 1 is an inwardly projecting flange 2 positioned along the inner wall of the member 1. Projecting inwardly from the edge of the member 1 is a short flange 3.

Positioned within the member 1 and insulated therefrom I provide a supported stud 4 provided with a projecting threaded end 5 and a head 6. The members 1 and 4 are held in insulated and fixed relation by means of the insulation 7 which is usually applied in a plastic condition under pressure, although it may be of a liquid condition originally which later becomes hard.

Projecting from the body member 1 is an internally threaded boss 8 and threadably secured to the boss is a projecting stud 9. It is quite evident that the boss 8 and the stud 9 can be formed as a single integral unit with the body 1 so that the entire body member and stud 9 will be one piece formed at the same time.

The upper face 10 of the body 1 is formed as a flat surface in order to fit against the lower flat face of the supporting beam 11. Projecting from the upper edge of the member 1 is a hook-shaped member 12 adapted to interlock with the edge of the support 11 and this inner face 13 is preferably angularly disposed in order to draw the surface 10 into close engagement with the support 11 when in position.

Slidably mounted upon the stud 9 is a collar 14 having a hook-shaped projection 15 adapted to engage the opposite edge of the support 11 from that engaged by the hook 12. The inner face 16 of the hook 15 is angularly disposed and thereby tends to draw the hanger tightly against the support 11.

In order to move the collar 14 into engagement with the support 11 there is mounted upon the threaded stud 9 a threaded nut 17.

In order to install my device upon the support 11, the nut 17 is moved toward the outer end of the stud 9 a sufficient distance to permit applying the hook 12 to one edge of the support 11 and to then position the collar 14 against the opposite edge of the support 11 and this having been done the nut 17 is then rotated and moved into engagement with the collar 14. When such engagement is brought about preferably by means of the operator's hands a wrench may be applied to the nut 17 forcing it in strong engagement with the collar 14 and thereby positioning the hooks 12 and 15 more securely in engagement with the edges of the support 11.

The hanger having been positioned the trolley wire hanger or clamp, which does not form a part of my invention but which is well known to those skilled in the art, can then be applied to the threaded end 5 of the supporting stud.

There are, of course, modifications to the construction disclosed herein which will be apparent to those skilled in the art, therefore, I wish to be limited by my claims only.

I claim:—

1. A hanger comprising a body member, a supporting stud projecting therefrom and having means of attachment to a conductor support, insulation interposed between the body member and stud, hook-shaped means integrally secured to and projecting at one point from the top edge of the body member to engage an overhead support, means projecting from the side of the body member at the opposite side from the hook means, a slidable member mounted on the projecting means and having hook-shaped means to engage the overhead support and an adjustable member mounted on the projecting means to engage the slidable means to move the slidable means into engagement with the overhead support and maintain the hook-shaped means in locked relation with the said support.

2. A hanger comprising a body member having an inverted cup-shaped recess, a supporting stud mounted therein and insulated and supported from the body member by molded insulating material, a hook-shaped member of limited width secured to the outer and upper edges of the body member to engage an overhead support, a projecting member from the body oppositely disposed to the said hook-shaped member, a collar slidably mounted on the projecting member and having means to interlock with the overhead support and adjustable means rotatably mounted on the projecting member to be moved into engagement with the collar to move the collar and the hook-shaped member into locked engagement with the overhead support when the adjustable means is rotated in a predetermined direction to draw the upper face of the body member into engagement with the support.

3. A hanger to engage a support comprising a body member having an inverted cup-shaped recess, a supporting stud mounted within the recess and insulated from the body member, a stationary member and a movably adjustable member mounted on the body member, means on the last said members to engage and grip the support by a wedging action as the stationary member and adjustable member approach each other and move the body member into close engagement with the support and means to move the stationary and adjustable members toward each other.

4. A support comprising a body member, fixed means thereon to engage an over-head support, a boss projecting from the side face of the body member, an elongated member secured to the boss and projecting laterally therefrom, movable means mounted on the elongated member to engage the over-head support, means to move the movable means towards the fixed means and supporting means secured to the body for attachment to a conductor support.

5. A support comprising a body member, fixed means and slidable means thereon to engage an over-head support, means projecting laterally from the body to support the slidable means, rotatable means on the projecting means to engage the slidable means and move it towards the fixed means to grip the over-head support and draw the body into engagement with the support and insulated means secured to the body and provided with a supporting member.

6. A support comprising a body member, a fixed member secured to the body to engage an over-head support, an elongated member detachably secured to the body and having mounted thereon a movable member to engage the over-head support and a rotatable member to move it towards the fixed member to grip the over-head support and draw the body into engagement with the support.

7. A support comprising a body member, a member secured to the body to engage an over-head support, an elongated member projecting from a boss projecting from the side face of the body member and provided with threads, a slidable member mounted on the elongated member and a rotatable member engaging the threads on the elongated member to engage, when rotated, the slidable member and move it towards the fixed member to grip an over-head support and draw the body into engagement with the support.

In testimony whereof I affix my signature.

HOMER P. CHANDLER.